(12) United States Patent
Nakamura et al.

(10) Patent No.: US 11,840,212 B2
(45) Date of Patent: Dec. 12, 2023

(54) DRIVING FORCE CONTROL METHOD AND DRIVING FORCE CONTROL DEVICE (71) Applicant: NISSAN MOTOR CO., LTD., Yokohama (JP)

(72) Inventors: Yohei Nakamura, Kanagawa (JP); Yuki Ota, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/788,420

(22) PCT Filed: Dec. 24, 2019

(86) PCT No.: PCT/JP2019/050627
§ 371 (c)(1),
(2) Date: Jun. 23, 2022

(87) PCT Pub. No.: WO2021/130859
PCT Pub. Date: Jul. 1, 2021

(65) Prior Publication Data
US 2023/0020712 A1  Jan. 19, 2023

(51) Int. Cl.
B60W 30/18 (2012.01)
B60W 10/04 (2006.01)
B60W 10/18 (2012.01)
B60W 30/188 (2012.01)

(52) U.S. Cl.
CPC ............ B60W 10/04 (2013.01); B60W 10/18 (2013.01); B60W 30/188 (2013.01); B60W 30/18027 (2013.01)

(58) Field of Classification Search
CPC ...... B60W 10/04; B60W 10/10; B60W 10/18; B60W 30/188; B60W 30/18027; B60W 2540/10; B60W 2540/103
See application file for complete search history.

(56) References Cited

U.S. PATENT DOCUMENTS

| 5,820,515 A | * | 10/1998 | Fukaya | ............ B60W 30/18118 477/901 |
| 6,248,042 B1 | * | 6/2001 | Lee | ................... B60W 30/1819 477/109 |
| 9,505,408 B2 | | 11/2016 | Lima Ramirez | |
| 2009/0112432 A1 | | 4/2009 | Ueoka et al. | |
| 2015/0039185 A1 | * | 2/2015 | Kim | ................... B60W 10/182 701/41 |

(Continued)

FOREIGN PATENT DOCUMENTS

| DE | 10 2011 084 695 A1 | 11/2012 |
| JP | 06-098419 A | 4/1994 |
| JP | 2013-068145 A | 4/2013 |

(Continued)

Primary Examiner — Edwin A Young
(74) Attorney, Agent, or Firm — Foley & Lardner LLP (57) ABSTRACT When an accelerator pedal operation amount is large enough to generate a driving force after switching from a stopping range to a starting range is performed, in order to prevent a sudden starting immediately after the range switching, an upper limit of the driving force of a driving source is limited to a driving force larger than a holding threshold value for releasing holding of a stopping state of a vehicle and smaller than a required driving force based on the accelerator pedal operation amount.

5 Claims, 10 Drawing Sheets (56) References Cited

U.S. PATENT DOCUMENTS

2019/0047570 A1\* 2/2019 Iwanaka .......... B60W 30/18118

FOREIGN PATENT DOCUMENTS

| JP | 2014-156140 A | 8/2014 |
|----|---------------|---------|
| JP | 2014-156155 A | 8/2014 |
| JP | 2016-068871 A | 5/2016 |
| JP | 2016-205454 A | 12/2016 |

\* cited by examiner

DRIVING FORCE CONTROL METHOD AND DRIVING FORCE CONTROL DEVICE

TECHNICAL FIELD

The present invention relates to a driving force control method for a vehicle and a driving force control device of a vehicle.

BACKGROUND ART

There is known a range switching device that has a starting range in which a driving force is transmitted to a driving wheel in response to an accelerator pedal operation amount and a stopping range in which the driving force is not transmitted to the driving wheel even when an accelerator pedal is operated. In a vehicle including such a range switching device, a normal starting operation is to depress the accelerator pedal after switching from the stopping range to the starting range. According to this normal starting operation, the driving force gradually increases according to a gradual increase in the accelerator pedal operation amount after the switching to the starting range, and thus the vehicle can start smoothly.

In contrast, when an order of a range switching and an accelerator pedal operation is reversed, even if an accelerator pedal operation amount gradually increases, the driving force cannot be transmitted to the driving wheel because the vehicle is in the stopping range. Then, when the range is switched to the starting range, the driving force corresponding to the operation amount of the accelerator pedal that has already been operated is suddenly transmitted to the driving wheel, and the vehicle may suddenly start.

In order to suppress the sudden starting when the above-described normal starting operation is not performed, JP 2014-156155 A discloses a control that limits a driving force when an order of a range switching operation and an accelerator pedal operation is reversed.

SUMMARY OF INVENTION

Incidentally, in recent years, in order to prevent the vehicle from rolling back at the time of starting on a slope, the number of vehicles equipped with a mechanism for holding a braking force before the driving force transmitted to the driving wheel increases to a predetermined value at the time of the starting of the vehicle has being increased.

When the control in the above-described document is applied to such a vehicle equipped with a mechanism to limit the driving force, even though the starting range is selected and the accelerator pedal is depressed, there is a concern that the driving force does not increase to the predetermined value for releasing the holding of the braking force and the vehicle cannot be started. In order to allow the vehicle to start, a measure of decreasing the predetermined value for releasing the holding of the braking force may be considered. However, according to this measure, there is a concern that, at the time of starting on an uphill road, although the holding of the braking force is released, the vehicle cannot move forward with the limited driving force but moves backward.

Therefore, an object of the present invention is to release holding of a braking force to start a vehicle without sudden starting even when an order of a range switching operation and an accelerator pedal operation is reversed to a normal operation.

According to one embodiment of this invention, a driving force control method for a vehicle, the vehicle including: a driving source configured to generate a driving force for driving the vehicle, a range switching device including a starting range in which the driving force is transmitted from the driving source to a driving wheel in response to an accelerator pedal operation and a stopping range in which the driving force is not transmitted from the driving source to the driving wheel even when an accelerator pedal is operated, a holding device configured to hold a stopping state of the vehicle until the driving force is larger than a holding threshold value and to release the stopping state when the driving force is larger than the holding threshold value at the time of starting, and a control unit configured to calculate a driver's required driving force based on an accelerator pedal operation amount, is provided. The driving force control method comprising the control unit limits an upper limit of the driving force of the driving source to a driving force larger than the holding threshold value and smaller than the required driving force if the accelerator pedal operation amount is already large enough to generate the driving force when switching from the stopping range to the starting range is completed.

DESCRIPTION OF EMBODIMENTS

Hereinafter, embodiments of the present invention will be described with reference to the drawings.

Figure 1:
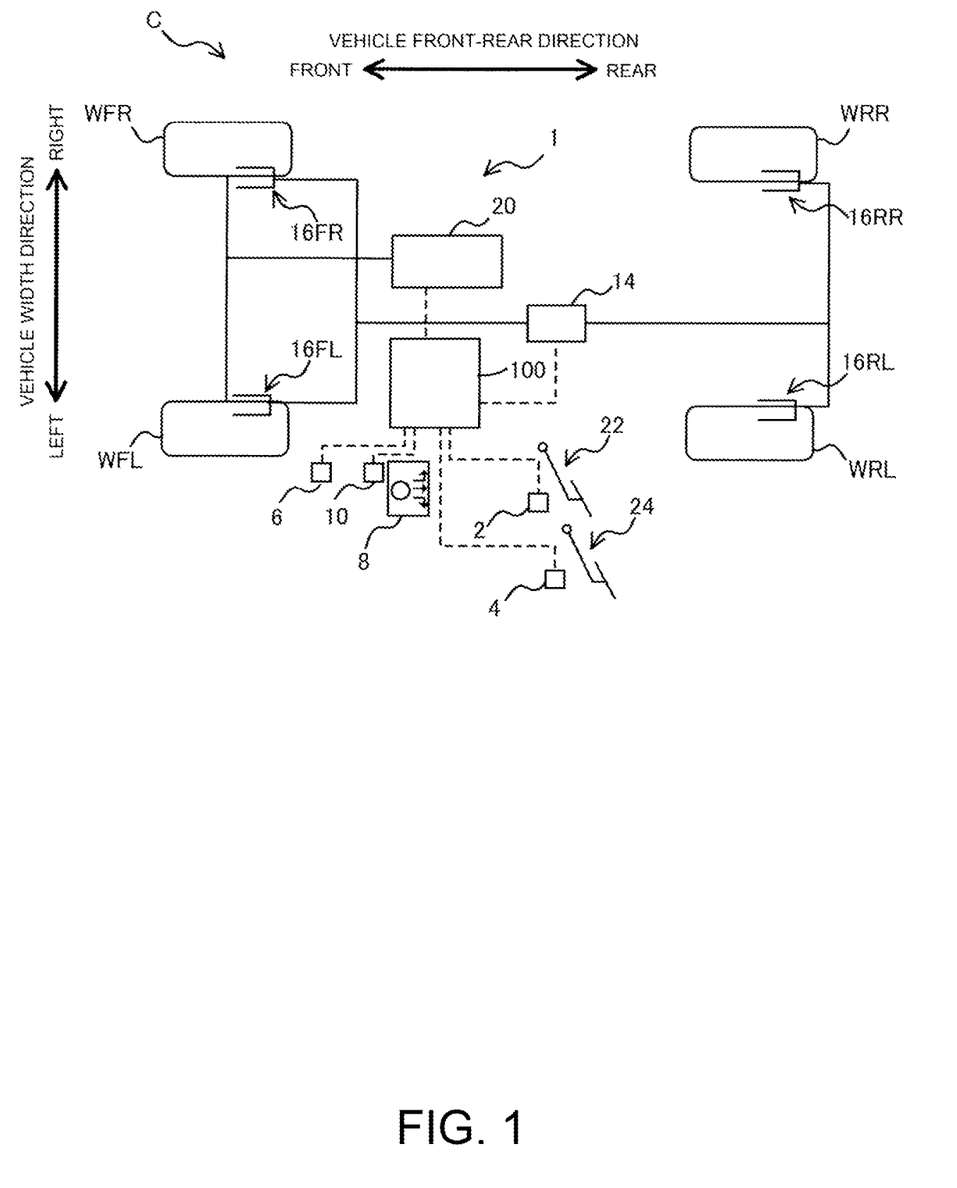
FIG. 1 is a schematic configuration diagram of a vehicle.

FIG. 1 is a schematic configuration diagram of a vehicle C equipped with a control system 1 according to the present embodiment.

The vehicle C includes an accelerator operation amount sensor 2, a brake operation amount sensor 4, a vehicle speed sensor 6, a shift position sensor 10, and a controller 100 as a control unit. The vehicle C further includes a brake actuator 14, a brake device 16, a driving motor 20 as a driving source, and wheels W (front right wheel WFR, front left wheel WFL, rear right wheel WRR, and rear left wheel WRL).

The accelerator operation amount sensor 2 is, for example, a sensor that is formed by using a pedal stroke sensor and detects an operation amount of an accelerator pedal 22 by a driver (depression operation amount).

The accelerator pedal 22 is a pedal to be operated by the driver of the vehicle C with an intention of braking or accelerating.

The accelerator operation amount sensor 2 outputs, to the controller 100, an information signal that includes the operation amount of the accelerator pedal 22 by the driver (may be referred to as "accelerator operation amount signal" in the following description).

The accelerator operation amount sensor 2 is not limited to being formed using the pedal stroke sensor and may detect a position (opening degree) of the accelerator pedal 22 by a depression operation of the driver.

That is, the accelerator operation amount sensor 2 is a sensor that detects the operation amount of the accelerator pedal 22 by the driver.

The brake operation amount sensor 4 is, for example, a sensor that is formed using a pedal stroke sensor and detects an operation amount of a brake pedal 24 by the driver (depression operation amount).

The brake pedal 24 is a pedal to be operated by the driver of the vehicle C with an intention of braking.

The brake operation amount sensor 4 outputs, to the controller 100, an information signal including the operation amount of the brake pedal 24 by the driver (may be referred to as "brake operation amount signal" in the following description).

The brake operation amount sensor 4 is not limited to being formed using the pedal stroke sensor and may detect a position (opening degree) of the brake pedal 24 by a depression operation of the driver, like the accelerator operation amount sensor 2.

That is, the brake operation amount sensor 4 is a sensor that detects the operation amount of the brake pedal 24 by the driver.

The vehicle speed sensor 6 is formed of, for example, a resolver for detecting a vehicle speed of the vehicle C based on a rotation speed of the driving motor 20.

The vehicle speed sensor 6 outputs, to the controller 100, an information signal including the detected vehicle speed (may be referred to as "vehicle speed signal" in the following description).

The shift position sensor 10 detects a current position of a range switching device 8 that changes a shift range of the vehicle C, such as a shift knob and a shift lever. A shift position includes a D range for a forward movement, an R range for a backward movement, a P range and an N range for stopping, and a B range for generating a strong regeneration brake. Among these shift positions, the D range, the R range, and the B range are also referred to as a starting range, and the P range and the N range are also referred to as a stopping range. When the starting range is selected, the driving motor 20 generates a driving force corresponding to an accelerator operation amount, and the driving force is transmitted to the front right wheel WFR and the front left wheel WFL, which are driving wheels. When the stopping range is selected, the driving motor 20 does not generate the driving force, and thus the driving force is not transmitted to the driving wheels.

The shift position sensor 10 outputs, to the controller 100, an information signal including the detected current position (may be referred to as "shift position signal" in the following description).

The controller 100 controls a braking force and the driving force to be generated in the vehicle C, and is implemented by a microcomputer. The microcomputer includes, for example, a central processing unit (CPU), a random access memory (RAM), and a read only memory (ROM).

The controller 100 performs various processes described later using various input information signals and outputs command signals for controlling the brake actuator 14 and the driving motor 20 (braking command signal and driving command signal). A specific configuration of the controller 100 will be described later.

The braking command signal is an information signal including a braking force command value for controlling the braking force to be generated in the vehicle C.

The braking force command value includes at least one of a command value of a friction braking torque, which is a command value for controlling oil hydraulic pressures of respective brake devices 16, and a command value of a regeneration braking torque generated at the driving motor 20.

The braking force command value is calculated by the controller 100 in accordance with the operation amount of the accelerator pedal 2 or a depression amount of the brake pedal 24 by the driver of the vehicle C, a gradient of a road surface on which the vehicle C travels, and the like.

The driving command signal is an information signal including a required driving force for controlling the driving force or a regeneration braking force to be generated by the driving motor 20. The required driving force is a driving force required by the driver of the vehicle C and is calculated by the controller 100 in accordance with the operation amount of the accelerator pedal 2 by the driver.

The brake actuator 14 is a hydraulic pressure control device interposed between a master cylinder (not shown) and each brake device 16. The brake actuator 14 changes oil hydraulic pressures of the respective brake devices 16 in accordance with the braking force command value included in the braking command signal received from the controller 100. Accordingly, the brake actuator 14 applies the braking force to each wheel W.

The brake device 16 generates a pressing force for pressing a brake pad (not shown) constituting a disc brake against a disc rotor (not shown). The disc rotor is a member that rotates integrally with each wheel W and comes into contact with the brake pad to generate frictional resistance.

That is, the brake actuator 14, the master cylinder, and each brake device 16 form a friction brake provided in the vehicle C.

In FIG. 1, the brake device 16 arranged for the front right wheel WFR is illustrated as a brake device 16FR, and the brake device 16 arranged for the front left wheel WFL is illustrated as a brake device 16FL. Similarly, in FIG. 1, the brake device 16 arranged for the rear right wheel WRR is illustrated as a brake device 16RR, and the brake device 16 arranged for the rear left wheel WRL is illustrated as a brake device 16RL. In the following description, each brake device 16 may be illustrated as described above.

The controller 100 controls the driving force generated by the driving motor 20 in accordance with the required driving force included in the driving command signal. The driving motor 20 may be controlled by a motor controller provided separately. The motor controller may control the driving force generated by the driving motor 20 in accordance with the required driving force from the controller 100. In this case, the motor controller outputs, to the controller 100, an information signal including a current driving force generated by the driving motor 20 (motor torque) (may be referred to as "current torque signal" in the following description).

The controller 100 controls a regeneration torque generated by the driving motor 20 in accordance with the command value of the regeneration braking torque included in the braking command signal.

The driving motor 20 generates the driving force or the regeneration braking force of the vehicle C, and applies the driving force or the regeneration braking force to each wheel W via a drive shaft (not shown) or the like.

The vehicle C having the configuration described above has a function for holding a stopping state of the vehicle before the driving force transmitted from the driving motor 20 to the driving wheels WFL and WFR is larger than a holding threshold value and releasing the stopping state when the driving force is larger than the holding threshold value. Specifically, when the brake pedal 24 is depressed and the vehicle C stops, even if the operation amount of the brake pedal 24 becomes zero thereafter, the oil hydraulic pressure of the brake device 16 as the holding device is held to a value at which the vehicle is stopped. When the driving force transmitted from the driving motor 20 to the driving wheels WFL and WFR is larger than the holding threshold value, the oil hydraulic pressure of the brake device 16 is released. The expression "the driving force transmitted from the driving motor 20 to the driving wheels WFL and WFR is larger than the holding threshold value" is not limited to a case where the driving force actually transmitted is larger than the holding threshold value, but also includes a case where a command value for the driving force to the driving motor 20 calculated by the controller 100 is larger than the holding threshold value. The holding threshold value is, for example, a lower limit torque at which the vehicle C can be started in an advancing direction, and is set in accordance with a gradient of a road surface on which the vehicle C stops.

In the present embodiment, the brake device 16 is used as the holding device, but the holding device is not limited thereto. For example, an electric parking brake or an electric park lock mechanism that operates in the P range can be used as the holding device.

Incidentally, as a procedure for starting the vehicle C from a state in which the shift position is in the stopping range, it is normal to switch the shift position to the starting range and then depress the accelerator pedal 22. The reason is as follows. By switching the shift position from the stopping range to the starting range, the driving force of the driving motor 20 is transmitted to the driving wheels WFL and WFR. In this state, if the accelerator pedal 22 is depressed, the driving force transmitted to the driving wheels WFL and WFR gradually increases according to a gradual increase in the depression amount of the accelerator pedal 22, and thus the vehicle C can start smoothly without sudden starting.

In contrast, an abnormal operation of switching the shift position from the stopping range to the starting range after the accelerator pedal 22 is depressed may be performed. In this case, the driving motor 20 does not generate the driving force even when the accelerator pedal 22 is depressed while the shift position is in the stopping range. However, when a driving force limit described later is not performed, once the shift position is switched to the starting range, the driving force of the driving motor 20 suddenly increases toward a driving force corresponding to the depression amount of the accelerator pedal 22 at this time, and thus the vehicle C suddenly starts.

Thus, when the normal starting procedure is not performed, in order to avoid the sudden starting, the controller 100 notifies the driver that an abnormal starting procedure is being performed, and limits an upper limit of the driving force generated by the driving motor 20 to a driving force larger than the holding threshold value and smaller than the required driving force. In limiting the driving force, the controller 100 limits an increase gradient, which is an increase amount of the driving force per unit time, to a value smaller than a maximum increase gradient in the case of the normal starting procedure to start the vehicle, and switches the increase gradient to a smaller increase gradient when the driving force is larger than a threshold value described later after the starting. Details of this driving force limit will be described later.

Figure 2:
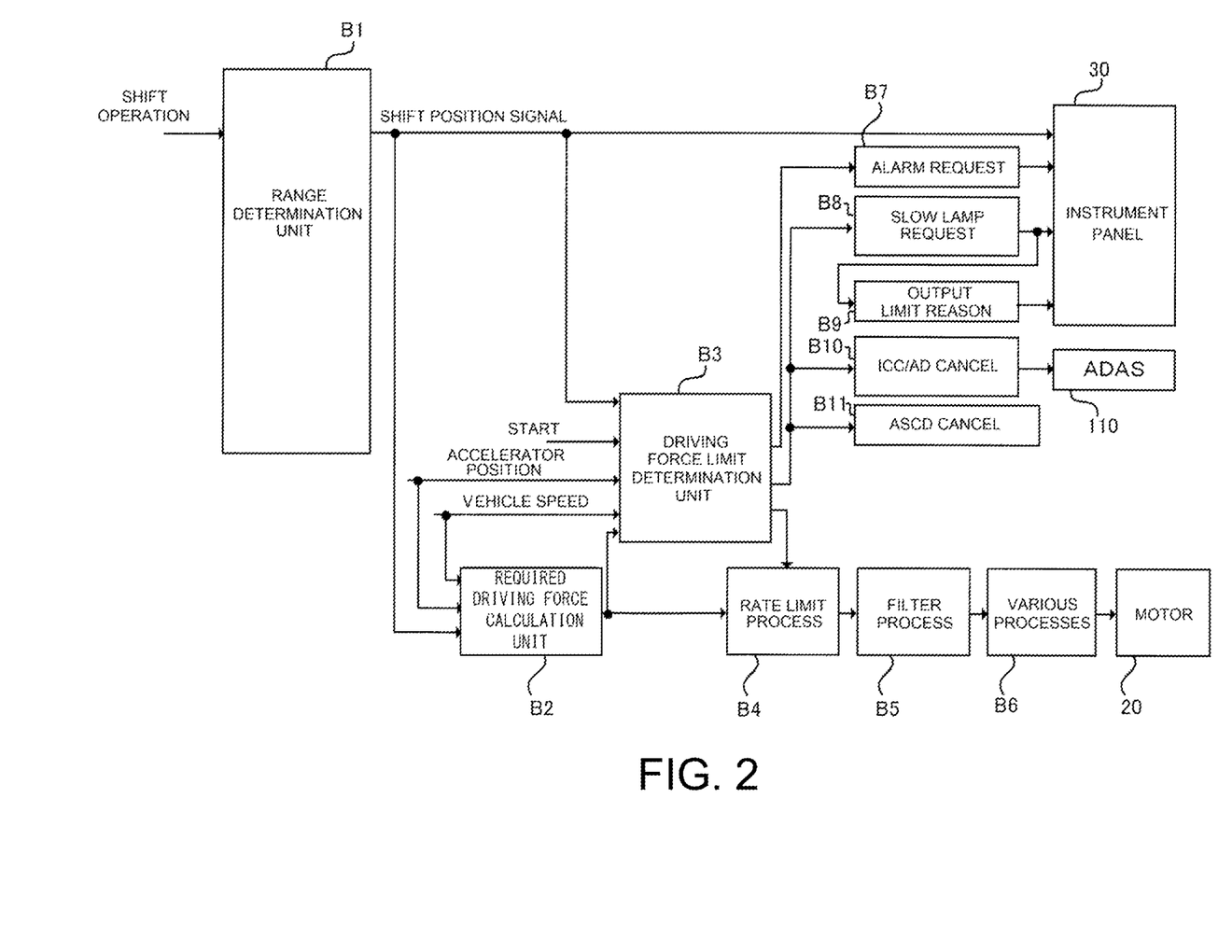
FIG. 2 is a block diagram illustrating an outline of a control system of the vehicle.

FIG. 2 is a block diagram illustrating an outline of a control system of the vehicle according to the present embodiment.

The control system includes a range determination unit B1 that determines a current shift position based on a shift operation of the driver. A shift position signal output from the range determination unit B1 is input to an instrument panel 30, a required driving force calculation unit B2, and a driving force limit determination unit B3.

The instrument panel 30 includes a display unit and a plurality of instruments such as a speed meter and an output meter and also includes a shift position display portion on which the current shift position is indicated. The shift position display portion displays the current shift position thereon.

Figure 3:
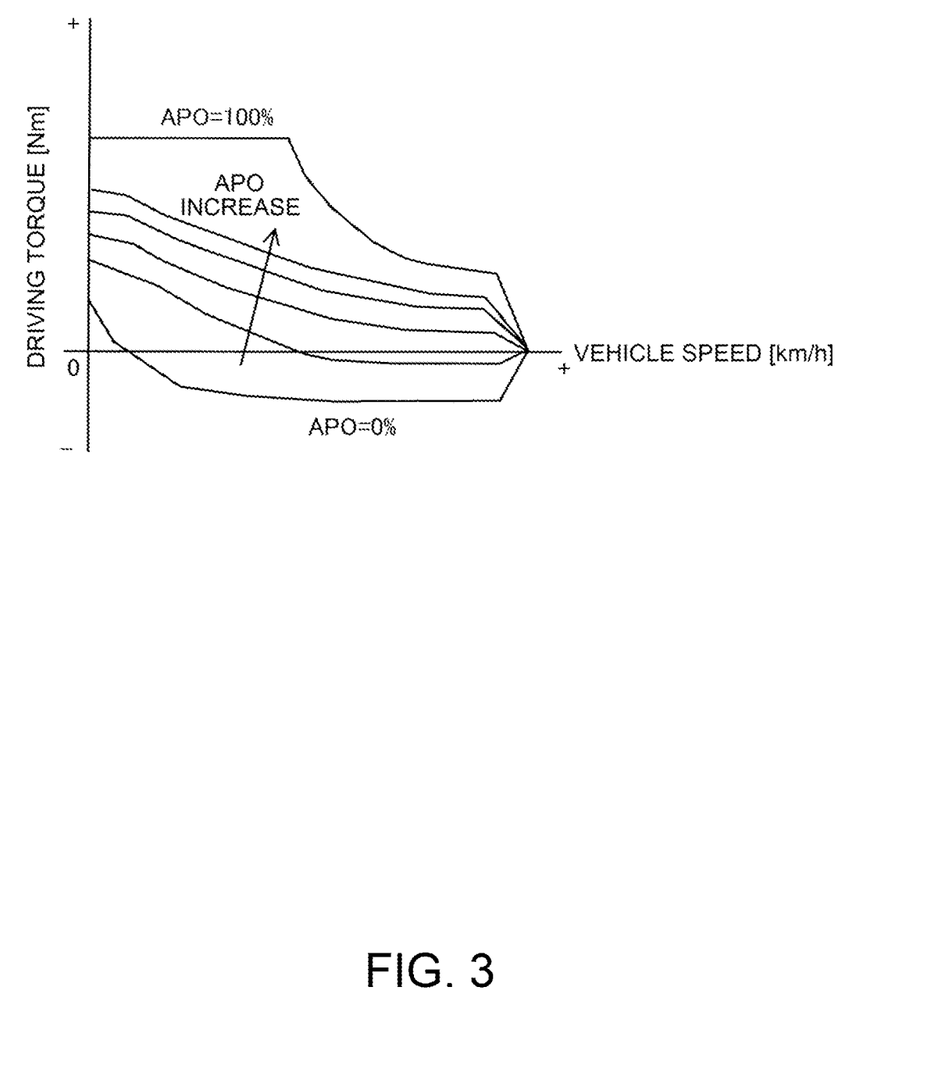
FIG. 3 is a diagram illustrating an example of a driving force map for a forward movement.
Figure 4:
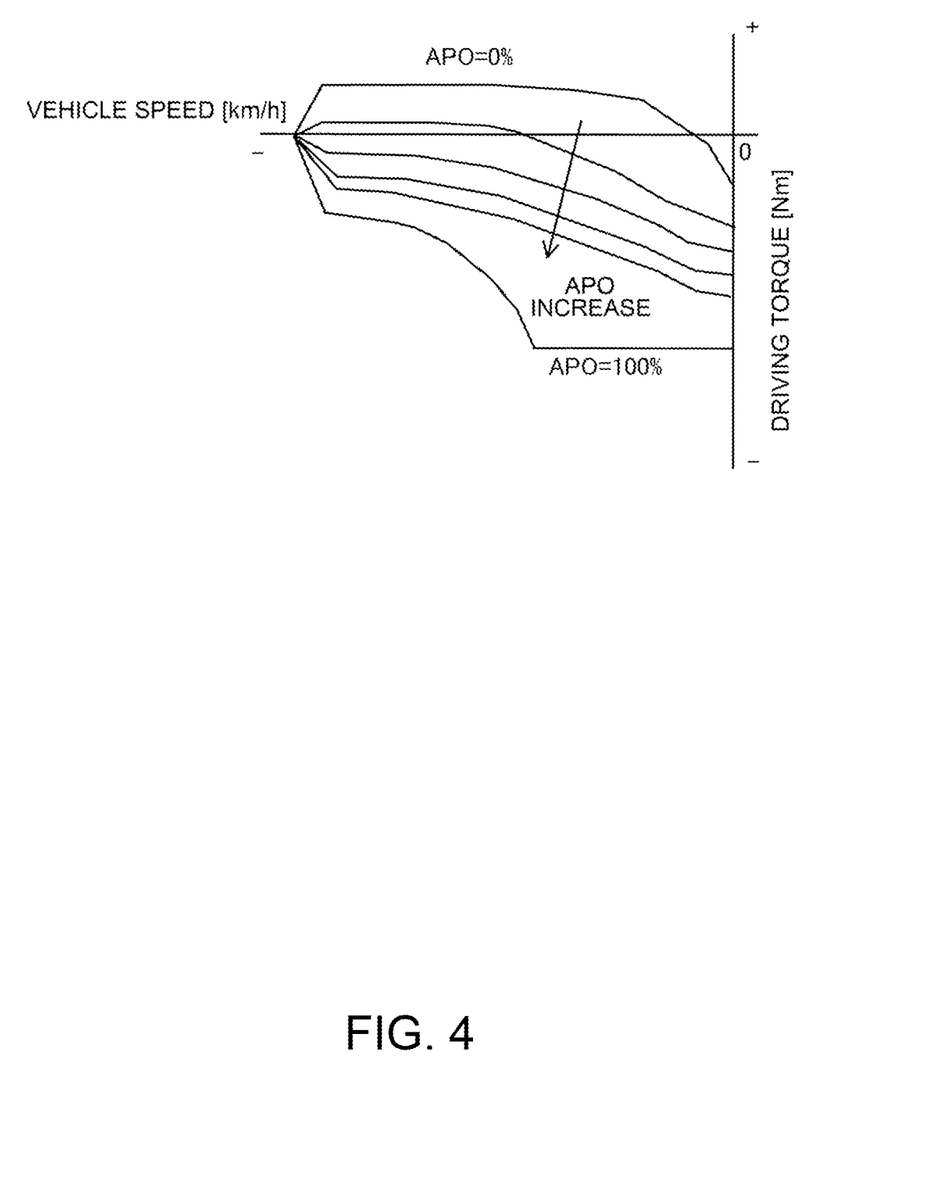
FIG. 4 is a diagram illustrating an example of a driving force map for a backward movement.

The required driving force calculation unit B2 reads a accelerator operation amount signal and a vehicle speed signal in addition to the shift position signal and calculates, based on these signals, a required driving force corresponding to the accelerator operation amount of the driver. Specifically, for example, the required driving force calculation unit B2 calculates the required driving force using driving force maps illustrated in FIGS. 3 and 4. FIG. 3 is a diagram illustrating a driving force map for a forward range, and FIG. 4 is a diagram illustrating a driving force map for a backward range. The required driving force calculation unit B2 selects one of the maps in accordance with the shift position signal, and uses the accelerator operation amount signal and the vehicle speed signal to search the map, thereby determining the required driving force.

The driving force limit determination unit B3 determines, based on the shift position signal, an activated state signal, the accelerator operation amount signal, the vehicle speed signal, and the required driving force, whether to limit the driving force when the above normal starting procedure is not performed and calculates a limited driving force. The activated state signal is a signal indicating whether the vehicle system is activated. Contents of the determination and the calculation will be described later.

The required driving force calculated by the required driving force calculation unit B2 and the limited driving force calculated by the driving force limit determination unit B3 are transmitted to the driving motor 20 via a rate limit process B4, a filter process B5, and various processes B6. The rate limit process B4 and the filter process B5 are processes for changing the driving force according to a minute accelerator operation amount that is unconsciously performed by the driver. In a state in which the driver puts his/her foot on the accelerator pedal, the accelerator operation amount may slightly change even if the driver does not intend to do so. When the driving force is sequentially changed in response to such a change in the accelerator operation amount, driving performance and ride comfort are deteriorated. Therefore, the driving force is changed by the rate limit process B4 and the filter process B5. The rate limit process B4 and the filter process B5 are publicly known processes.

In the various processes B6, the driving force is limited under other conditions. As a condition for limiting the driving force, a battery temperature may be higher than a preset threshold value. The various processes B6 are also publicly known processes.

A determination result of the driving force limit determination unit B3 is also used for each of an alarm request process B7, a slow lamp request process B8, an ICC/AD cancel process B10, and an ASCD cancel process B11.

The alarm is used for notifying the driver that the normal starting procedure has not been performed, and in the present embodiment, the driver is notified by issuing an alarm sound. The alarm request process B7 is a process for determining whether to issue the alarm sound.

The slow lamp request process B8 is a process for determining whether to turn on a slow lamp. The slow lamp referred to here is a lamp that is arranged in the instrument panel 30 and turned on when the driving force is being limited. When the driving force is limited, an acceleration of the vehicle is lower than an acceleration that should be originally obtained with a current accelerator operation amount, but by turning on the slow lamp, the driver can recognize that a cause of a decrease in the acceleration is not a vehicle failure. When the slow lamp is turned on, the instrument panel 30 also displays an output limit reason B9 thereon.

The ICC/AD cancel process B10 is a process for cancelling automatic driving (AD) and intelligent cruise control (ICC) in which the vehicle travels while maintaining an inter-vehicle distance from a preceding vehicle according to the vehicle speed, up to a vehicle speed set by the driver. That is, in the present embodiment, the driving force is limited when the normal starting operation is not performed, but while the driving force is limited, even when the operations for setting the ICC and the AD are performed, these operations are not accepted. Signals for cancelling these operations are input to an advanced driver assistance system (ADAS) 110.

The ASCD cancel process B11 is a process for cancelling vehicle speed control with respect to an auto speed control device (ASCD) that controls the vehicle speed when the ICC and the AD are executed. This process is accompanied by the cancel of the ICC and the AD.

Figure 5:
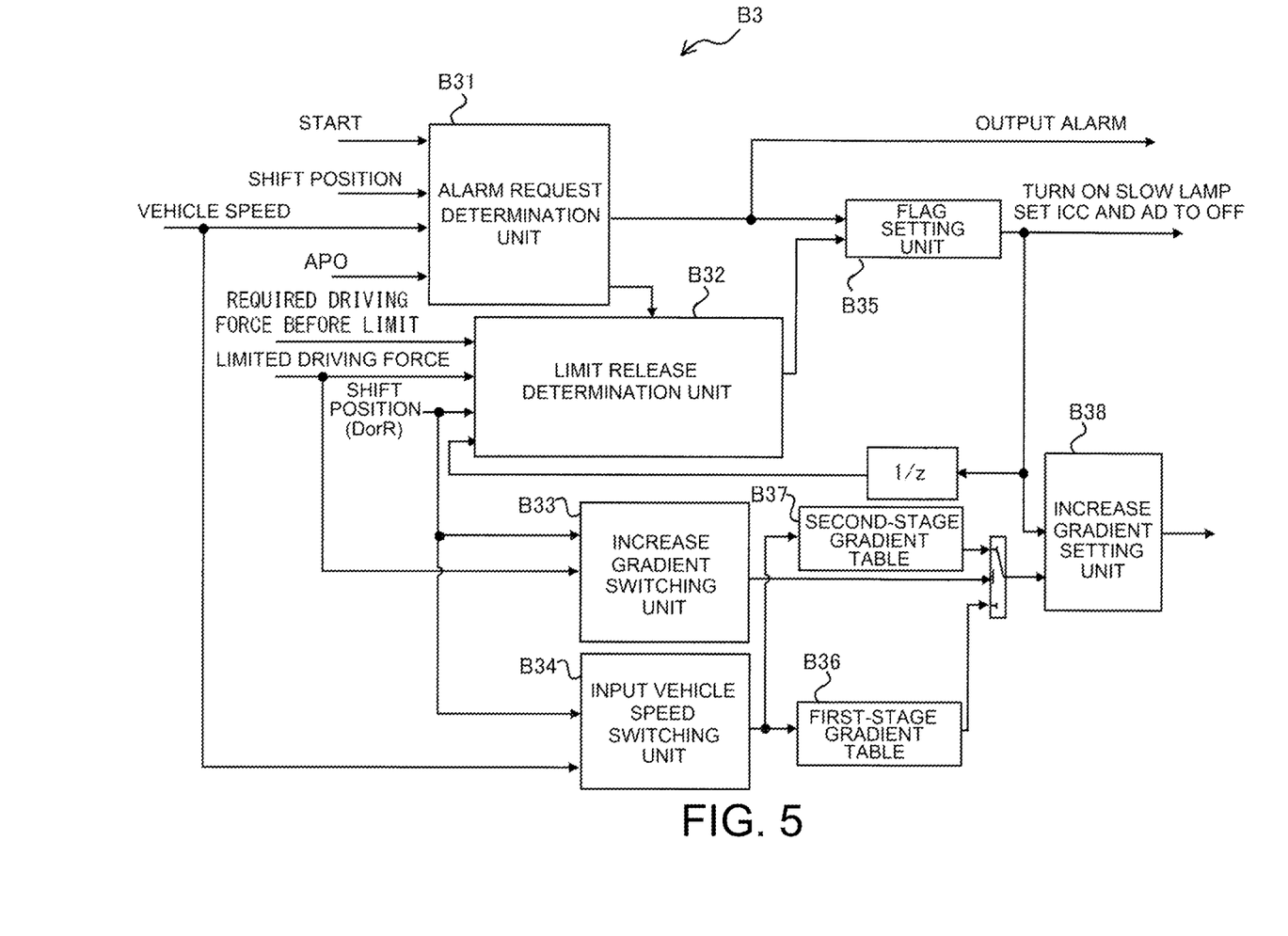
FIG. 5 illustrates a control block diagram illustrating contents of a process executed by a driving force limit determination unit.

Next, a process of the driving force limit determination unit B3 will be described.

FIG. 5 is a control block diagram illustrating contents of the process executed by the driving force limit determination unit B3.

Based on the activated state signal, the shift position signal, the vehicle speed signal, and the accelerator operation amount signal, an alarm request determination unit B31 determines presence or absence of an alarm request. Specifically, the alarm request determination unit B31 determines that the alarm request is present when all conditions including that the vehicle is in the activated state, the shift position is in the stopping range, the vehicle is stopped, and the accelerator pedal is depressed are satisfied, and sets an alarm request flag when the alarm request is determined to be present. Whether the vehicle is stopped is determined based on the vehicle speed signal. At this time, if an absolute value of the vehicle speed is equal to or less than a predetermined value (for example, 4 km/h), it is determined that the vehicle is stopped. In addition, the expression "the accelerator pedal is depressed" means that the accelerator pedal is depressed to an extent that the driving motor 20 generates the driving force, for example, the position of the accelerator pedal is ⅛ or more with respect to full open.

When the alarm request flag is set, it is determined that the alarm is issued in the alarm request process B7 described above. In other words, when any one of the above conditions is not satisfied, no alarm is issued.

When it is determined that the alarm request is present, a signal for limiting the driving force is input from the alarm request determination unit B31 to a flag setting unit B35.

The flag setting unit B35 sets a driving force limit request flag unless a signal to release the driving force limit is input from a limit release determination unit B32 described later. When the driving force limit request flag is set, with the above-described slow lamp request process B8, ICC/AD cancel process B10, and ASCD cancel process B11, the slow lamp is turned on, the ICC and the AD are cancelled, and the ASCD also receives a cancel signal.

The limit release determination unit B32 determines whether to release the driving force limit based on a determination result of the alarm request determination unit B31, a required driving force before the limit, the limited driving force, the shift position signal, and the driving force limit request flag. Specifically, when a state in which the alarm request flag is released and the limited driving force is equal to or larger than the required driving force before the limit continues for a predetermined period of time, the driving force limit is released. The required driving force before the limit is the driving force calculated by the required driving force calculation unit B2 in FIG. 2. The limited driving force is a previous calculated value of the driving force limited by control described later.

An increase gradient switching unit B33 switches the gradient between a first-stage gradient, which is an increase gradient at the time of the starting, and a second-stage gradient, which is a gradient switched from the first-stage gradient after the starting. Specifically, when the driving force is larger than a switching threshold value, the increase gradient is switched from the first-stage gradient to the second-stage gradient. The switching threshold value is set to a driving force that does not cause sudden starting even when the holding device 16 is released. For example, a driving force to the extent that the vehicle does not roll back on an uphill road is set by adaptation based on a vehicle weight or the like. A gradient of the uphill road assumed here is, for example, about 5% to 10%.

When the vehicle is in the R range, an input vehicle speed switching unit B34 converts the vehicle speed signal input to a first-stage gradient table and a second-stage gradient table, which are described later, from a negative value to a positive value. This is because it is sufficient to prepare one first-stage gradient table and one second-stage gradient table. When two types of each of the first-stage gradient table and the second-stage gradient table are prepared, one for the forward movement and one for the backward movement, the input vehicle speed switching unit B34 is unnecessary.

Figure 6:
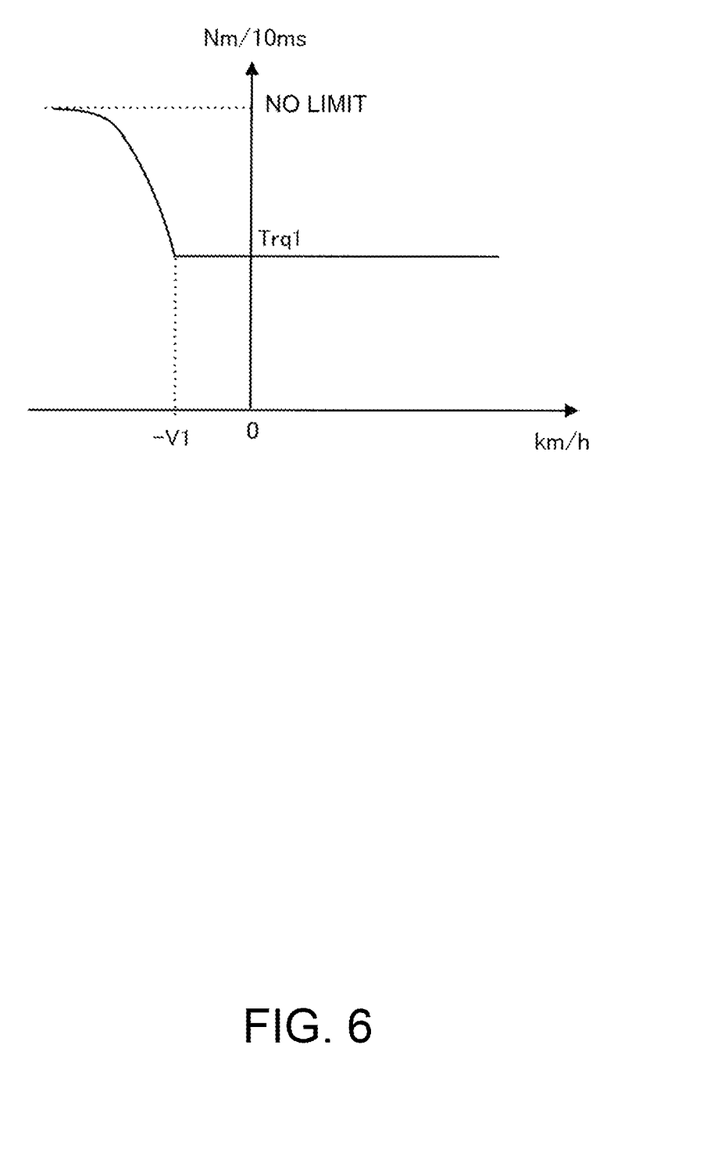
FIG. 6 is a diagram illustrating an example of a table used for setting a first-stage gradient.

In the first-stage gradient table B36, for example, as illustrated in FIG. 6, a horizontal axis represents the vehicle speed [km/h], and a vertical axis represents the increase gradient [Nm/10 ms]. The increase gradient is substantially constant at Trq1 when the vehicle speed is equal to or larger than −V1 [km/h], and increases as the vehicle speed decreases when the vehicle speed is smaller than −V1 [km/h].

The increase gradient Trq1 [Nm/10 ms] used here is a value at which the driving force rapidly increases to the switching threshold value, and is, for example, about 15 Nm/10 ms.

When the vehicle speed is smaller than −V1 [km/h], the reason why the increase gradient increases as the vehicle speed decreases is to prevent the vehicle from rolling back. That is, the vehicle speed of −V1 [km/h] is a rolling back threshold value for determining that the rolling back occurs. When the rolling back occurs, the driving force is rapidly increased, whereby the rolling back is prevented.

The rolling back threshold value −V1 [km/h] may be any value as long as the value indicates that the vehicle is moving in a direction opposite to the advancing direction, and is, for example, about −0.5 [km/h].

Figure 7:
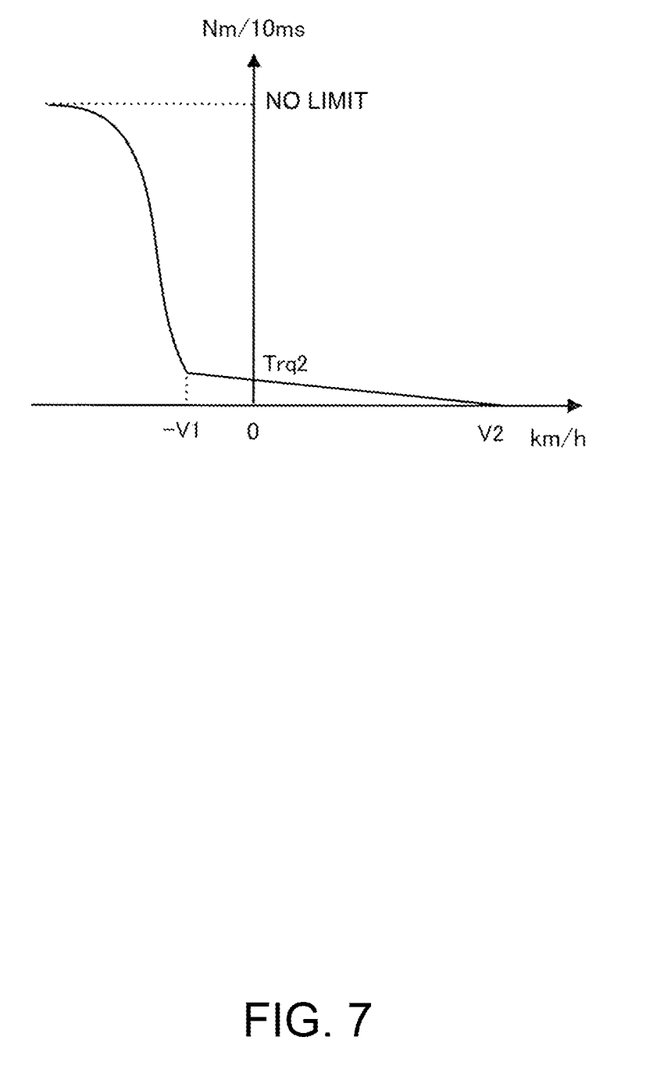
FIG. 7 is a diagram illustrating an example of a table used for setting a second-stage gradient.

In the second-stage gradient table B37, for example, as illustrated in FIG. 7, a horizontal axis represents the vehicle speed [km/h], and a vertical axis represents the increase gradient [Nm/10 ms]. The increase gradient decreases as the vehicle speed increases when the vehicle speed is −V1 [km/h] or more and V2 [km/h] or less, and is zero when the vehicle speed is larger than V2 [km/h]. When the vehicle speed is smaller than −V1 [km/h], the increase gradient increases as the vehicle speed decreases. The reason why the increase gradient increases as the vehicle speed decreases when the vehicle speed is smaller than −V1 [km/h] is the same as that in the first-stage gradient.

The increase gradient in the case where the vehicle speed is −V1 [km/h] or more is set to be smaller than that in the first-stage gradient and to a magnitude at which the driver does not feel the sudden starting. For example, in comparison with the vehicle speed of 0 [km/h], an increase gradient Trq2 [Nm/10 ms] in the second-stage gradient table is smaller than the increase gradient Trq1 in the first-stage gradient table, and is, for example, 1 [Nm/10 ms].

The vehicle speed V2 [km/h] is appropriately set in accordance with a magnitude of the Trq2 [Nm/10 ms]. When the vehicle speed is larger than V2 [km/h], the increase gradient is zero, and thus when the vehicle speed is larger than V [km/h] during the driving force limit, a maximum value of the driving force reached is smaller than the required driving force.

An increase gradient setting unit B38 sets the increase gradient based on a value of the first-stage gradient or the second-stage gradient, which is selected by the increase gradient switching unit B33, and information about whether the driving force limit request flag is set by the flag setting unit B35. Specifically, when the driving force limit request flag is set, the first-stage gradient or the second-stage gradient is set as the increase gradient, and when the driving force limit request flag is not set, the driving force is not limited. When the driving force is not limited, the increase gradient is an increase gradient according to a specification of the driving source (also referred to as "maximum increase gradient").

Next, a case where the above-described control is executed will be described with reference to timing charts in FIGS. 8 to 10.

Figure 8:
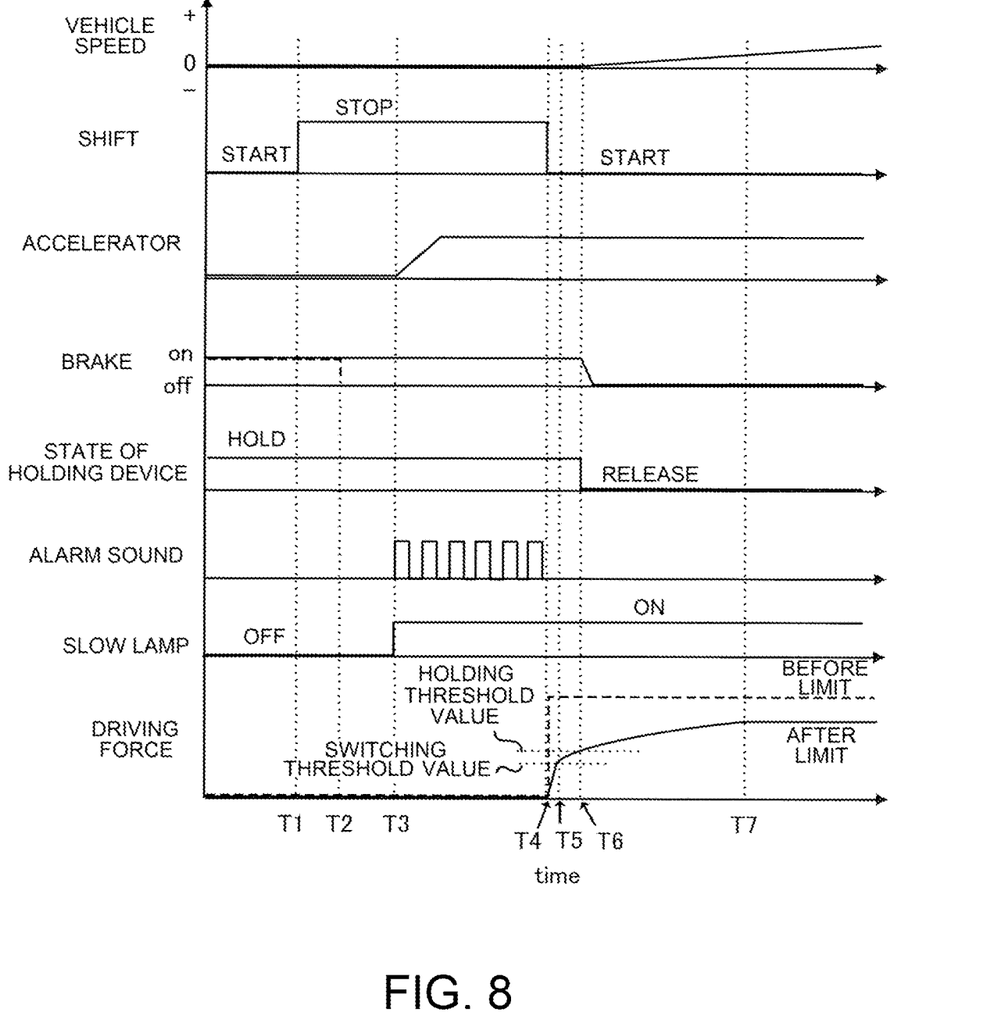
FIG. 8 is a first timing chart when the vehicle starts in an abnormal starting procedure.

FIG. 8 is a timing chart illustrating a basic pattern in a case where the vehicle starts in the abnormal starting procedure.

As illustrated in the drawing, at a timing T1 at which the vehicle is stopped with the accelerator pedal 22 is off, the brake pedal 24 is on, and the shift position is in the starting range, the driver switches the shift position to the stopping range, and at a subsequent timing T2, the driver sets the brake pedal 24 to be off. Even when the driver sets the brake pedal 24 to be off, a brake-on state is held by the holding device.

In the above state, when the driver depresses the accelerator pedal 22 at a timing T3, all the conditions for setting the alarm request flag are satisfied. Accordingly, the alarm sound is issued, and the slow lamp is turned on. The alarm sound is issued in a pulsed manner as illustrated in the drawing.

When the driver switches the shift position to the starting range at a timing T4 despite of the issuing of the alarm sound, the alarm sound stops, and the driving force of the driving motor 20 begins to increase at the first-stage gradient.

When the driving force is larger than the switching threshold value at a timing T5, the increase gradient is switched from the first-stage gradient to the second-stage gradient. Then, when the driving force is larger than the holding threshold value at a timing T6, the holding device is switched from a holding state to a release state, and accordingly, the state of the brake is switched from on to off.

After the vehicle speed reaches V2 [km/h] described above at a timing T7, the increase gradient is zero, and thus the limited driving force is constant.

Figure 9:
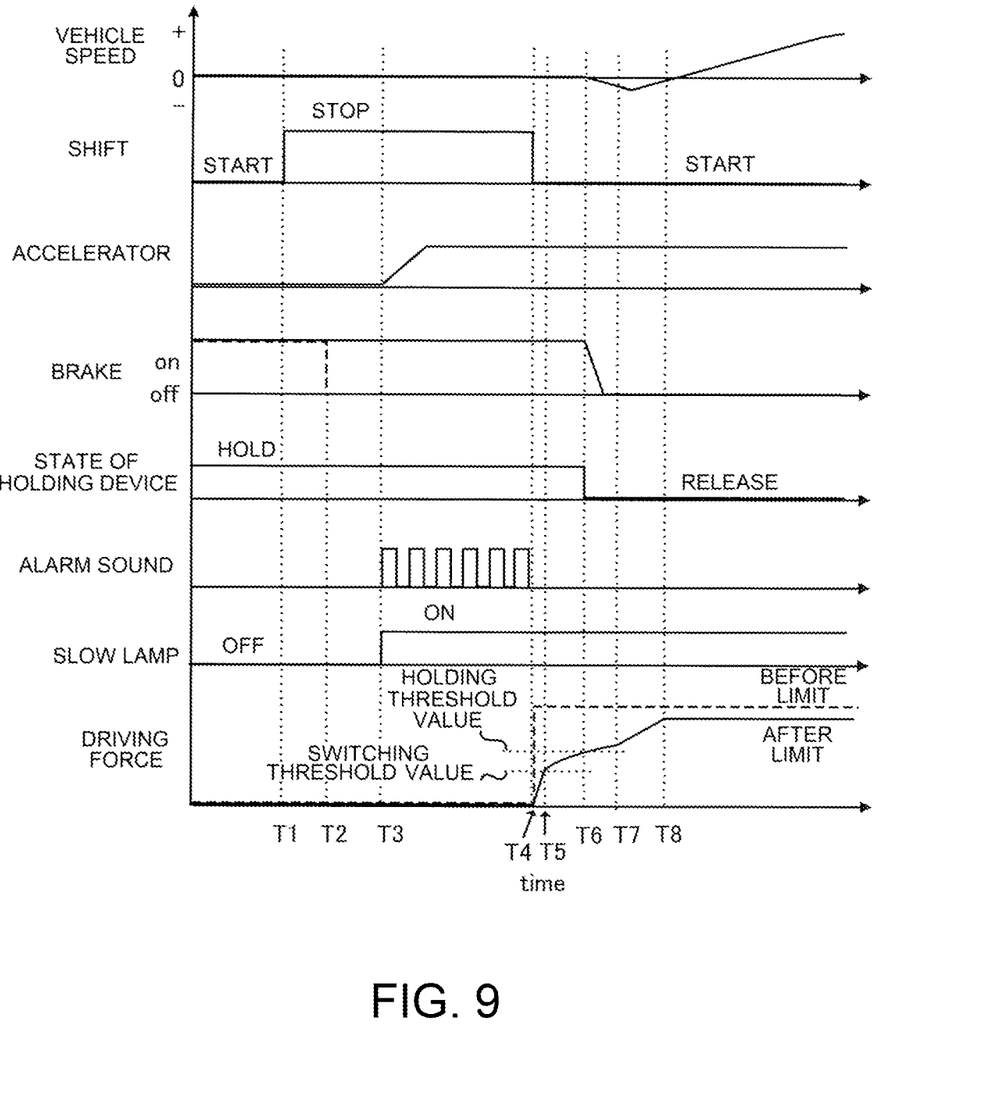
FIG. 9 is a second timing chart when the vehicle starts in the abnormal starting procedure.

FIG. 9 is a timing chart in a case where the vehicle starts in the abnormal starting procedure on an uphill road having a steep gradient. Operations up to the timing T6 are the same as in FIG. 8, and thus the description is omitted.

When the holding device enters the release state at a timing T6, the vehicle speed increases in the negative direction. That is, the vehicle starts to roll back. When a road surface gradient is larger than a gradient assumed at the time of setting the holding threshold value, such rolling back may occur.

Then, when the vehicle speed reaches −V1 [km/h] described above at a timing T7, the increase gradient of the driving force increases. Accordingly, the vehicle speed starts to increase and becomes a positive value after a timing T8. That is, the vehicle can start.

Figure 10:
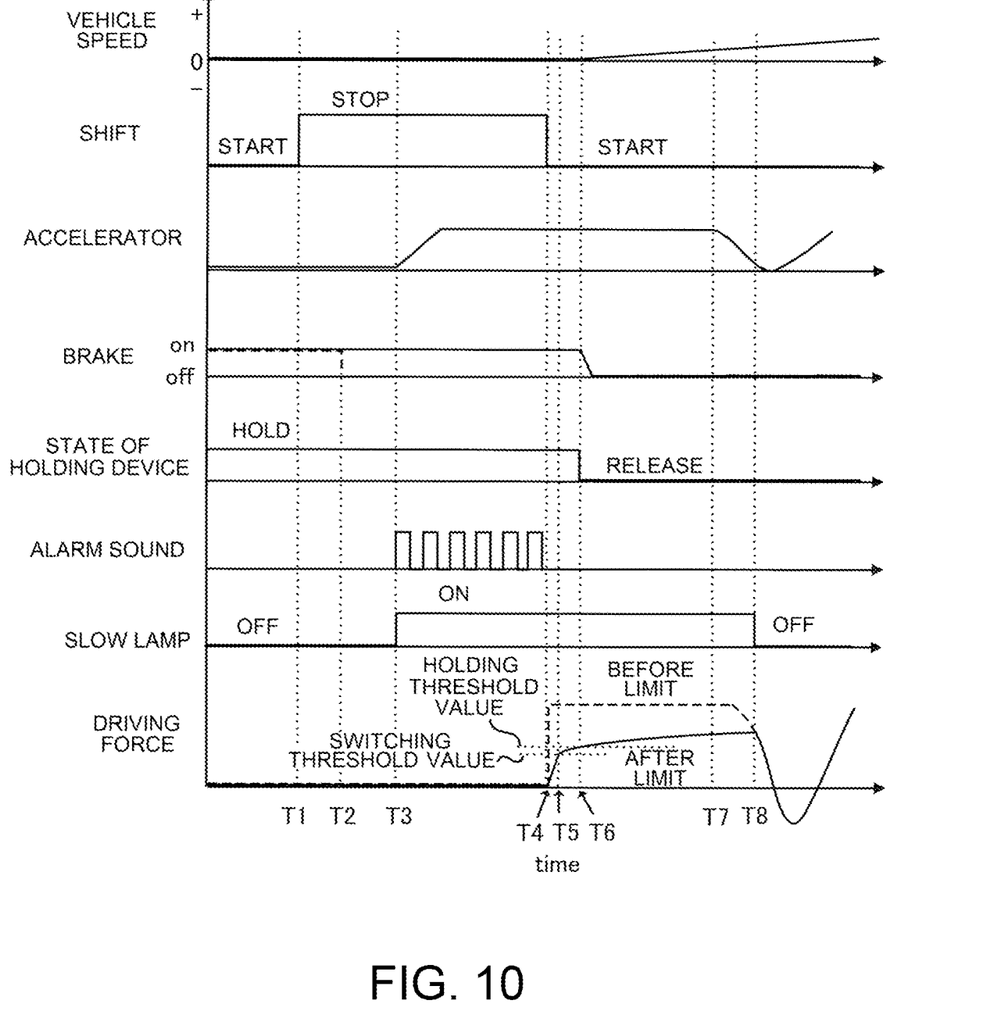
FIG. 10 is a third timing chart when the vehicle starts in the abnormal starting procedure.

FIG. 10 is a timing chart in a case where the vehicle starts in the abnormal starting procedure and the depression amount of the accelerator pedal 22 decreases during the execution of the driving force limit. The operations up to the timing T6 are the same as in FIG. 8, and thus the description is omitted.

At a timing T7 at which the driving force increases at the second-stage gradient, the depression amount of the accelerator pedal 22 starts to decrease, and accordingly, the required driving force before the limit also starts to decrease. Then, when the required driving force before the limit falls below the limited driving force at a timing T8, the driving force limit is completed, and the required driving force is adopted as the driving force of the driving motor 20. Accordingly, the slow lamp is turned off.

In FIG. 10, the driving force limit is released and the slow lamp is turned off at the timing T8 at which the required driving force before the limit falls below the limited driving force. However, in order to avoid erroneous determination due to noise or the like, as described in the description of the limit release determination unit B32, it is desirable to release the limit after a state in which the limited driving force is equal to or larger than the required driving force before the limit continues for a predetermined period of time.

In FIG. 8, the limited driving force reaches a plateau in a state in which the limited driving force is smaller than the required driving force before the limit, but in actual travelling, there is a chance that the accelerator pedal 22 is set to be off after the starting. At this time, the driving force limit is released, same as the case in FIG. 10.

As described above, the present embodiment provides a driving force control method for a vehicle. The vehicle includes: the driving motor 20 configured to generate the driving force for driving the vehicle; the range switching device 8 including the starting range in which the driving force is transmitted from the driving motor 20 to the driving wheels WFR and WFL in response to the accelerator pedal operation and the stopping range in which the driving force is not transmitted from the driving motor 20 to the driving wheel even when the accelerator pedal 22 is operated; the holding device 16 configured to hold the stopping state of the vehicle before the driving force transmitted from the driving motor 20 to the driving wheels WFR and WFL is larger than the holding threshold value and to release the stopping state when the driving force is larger than the holding threshold value at the time of the starting; and the controller 100 configured to calculate the required driving force of the driver based on the accelerator pedal operation amount. The driving force control method include: the controller 100 limiting the upper limit of the driving force of the driving motor 20 to a driving force larger than the holding threshold value and smaller than the required driving force if the accelerator pedal operation amount is already large enough to generate the driving force when the switching from the stopping range to the starting range is completed.

Accordingly, even when the vehicle starts in the abnormal starting procedure, the vehicle does not suddenly start. The holding device 16 is reliably released, and thus the vehicle can start.

In the present embodiment, the controller 100 limits, when limiting the upper limit of the driving force, the increase gradient, which is the increase amount of the driving force per unit time, to the second-stage gradient (first gradient) smaller than the maximum increase gradient, which is the increase gradient in a case where the accelerator pedal operation amount is large enough to generate the driving force after the switching from the stopping range to the starting range is performed. Accordingly, when the vehicle starts in the abnormal starting procedure, the sudden starting can be prevented more reliably.

In the present embodiment, the controller 100 limits, when limiting the upper limit of the driving force, the increase gradient to the first-stage gradient (second gradient) larger than the second-stage gradient and smaller than the maximum increase gradient from the switching to the starting range until the driving force reaches the switching threshold value (gradient change threshold value) smaller than the holding threshold value and limits the increase gradient to the first gradient when the driving force reaches the switching threshold value. Accordingly, a time to reach the holding threshold value can be shortened. Since the switching threshold value is smaller than the holding threshold value, the vehicle does not start during a period when the driving force is increasing at the first-stage gradient. That is, no sudden starting occurs.

In the present embodiment, the controller 100 increases the increase gradient to be larger than the second-stage gradient in a case where the vehicle rolls back (moves backward) after the switching to the starting range is performed. Accordingly, even when the vehicle starts in the abnormal starting procedure on an uphill road, the rolling back of the vehicle can be prevented.

In the present embodiment, the controller 100 releases the limit of the upper limit of the driving force when the required driving force falls below the limited driving force. The driving force is limited when the vehicle starts in the abnormal starting procedure, but it is necessary to release the limit of the driving force in order to continue the travelling. In this regard, since a chance for the depression amount of the accelerator pedal to decrease after the vehicle starts reliably occurs, the limit can be released without a complicated operation according to the present embodiment. Further, if the required driving force is larger than the limited driving force when the limit is released, there is a concern that the driving force rapidly increases in order to follow the required driving force. However, according to the present embodiment, the limit is released when the required driving force falls below the limited driving force, and thus there is no concern that the driving force rapidly increases after the release of the limit.

In the present embodiment, a case where the drive source is the driving motor 20 has been described, and the present invention can be similarly applied to a vehicle including an internal combustion engine as the drive source and a shift device that connects and disconnects power transmission between the driving source and the driving wheels. In the present embodiment, a configuration in which the braking force can be controlled by the accelerator pedal 2 has been described, and the present embodiment can be applied even when the accelerator pedal 2 controls only the driving force.

Although the embodiments of the present invention have been described above, the above-mentioned embodiments are merely a part of application examples of the present invention, and do not mean that the technical scope of the present invention is limited to the specific configurations of the above-mentioned embodiments.

The invention claimed is:

1. A driving force control method for a vehicle, the vehicle including:
    a driving source configured to generate a driving force for driving the vehicle,
    a range switching device including a starting range in which the driving force is transmitted from the driving source to a driving wheel in response to an accelerator pedal operation and a stopping range in which the driving force is not transmitted from the driving source to the driving wheel even when an accelerator pedal is operated,
    a holding device configured to hold a stopping state of the vehicle until the driving force is larger than a holding threshold value and to release the stopping state when the driving force is larger than the holding threshold value at a time at which the range switching device is switched from the stopping range to the starting range, and
    a control unit configured to calculate a driver's required driving force based on an accelerator pedal operation amount, the driving force control method comprising using the control unit to perform steps comprising:
        limiting an upper limit of the driving force of the driving source to a driving force larger than the holding threshold value and smaller than the required driving force if the accelerator pedal operation amount is already large enough to generate the driving force when switching from the stopping range to the starting range is completed, and
        when limiting the upper limit of the driving force, limiting an increase gradient, which is an increase amount of the driving force per unit time, to a second gradient larger than a first gradient, which is smaller than a maximum increase gradient, which is the increase gradient in a case where the accelerator pedal operation amount is large enough to generate the driving force after the switching from the stopping range to the starting range is performed, and smaller than the maximum increase gradient from the switching to the starting range until the driving force reaches a gradient change threshold value smaller than the holding threshold value and limits the increase gradient to the first gradient when the driving force reaches the gradient change threshold value.

2. The driving force control method according to claim 1, wherein
the control unit increases the increase gradient to be larger than the first gradient in a case where the vehicle moves backward after the switching to the starting range is performed.

3. The driving force control method according to claim 2, wherein:
the control unit is configured to release the limit of the upper limit of the driving force in a case where the required driving force falls below the driving force after the limit.

4. The driving force control method according to claim 1, wherein:
the control unit releases the limit of the upper limit of the driving force in a case where the required driving force falls below the driving force after the limit.

5. A driving force control device, comprising:
a driving source configured to generate a driving force for driving a vehicle;
a range switching device including a starting range in which the driving force is transmitted from the driving source to a driving wheel in response to an accelerator pedal operation and a stopping range in which the driving force is not transmitted from the driving source to the driving wheel even when an accelerator pedal is operated;
a control unit configured to calculate a driver's required driving force based on an accelerator pedal operation amount and to control the driving source based on the required driving force; and
a holding device configured to hold a stopping state of the vehicle until the driving force is larger than a holding threshold value and to release the stopping state when the driving force transmitted from the driving source to the driving wheel is larger than the holding threshold value at a time at which the range switching device is switched from the stopping range to the starting range, wherein
the control unit is configured to:
limit an upper limit of the driving force of the driving source to a driving force larger than the holding threshold value and smaller than the required driving force if the accelerator pedal operation amount is already large enough to generate the driving force when switching from the stopping range to the starting range is completed, and
when limiting the upper limit of the driving force, limit an increase gradient, which is an increase amount of the driving force per unit time, to a second gradient larger than a first gradient, which is smaller than a maximum increase gradient, which is the increase gradient in a case where the accelerator pedal operation amount is large enough to generate the driving force after the switching from the stopping range to the starting range is performed, and smaller than the maximum increase gradient from the switching to the starting range until the driving force reaches a gradient change threshold value smaller than the holding threshold value and limits the increase gradient to the first gradient when the driving force reaches the gradient change threshold value.

* * * * *